United States Patent
Hoffman et al.

(10) Patent No.: US 11,128,574 B2
(45) Date of Patent: Sep. 21, 2021

(54) METHOD AND APPARATUS FOR FACILITATING ACCESSING HOME SURVEILLANCE DATA BY REMOTE DEVICES

(71) Applicant: ipDataTel, LLC, Sugar Land, TX (US)

(72) Inventors: Byron L. Hoffman, Houston, TX (US); Eric R. Lachney, League City, TX (US); Michael R. Miller, Brookeland, TX (US); Russell S. Vail, Houston, TX (US)

(73) Assignee: ipDataTel, LLC, Sugar Land, TX (US)

( * ) Notice: Subject to any disclaimer, the term of this patent is extended or adjusted under 35 U.S.C. 154(b) by 0 days.

(21) Appl. No.: 16/985,718

(22) Filed: Aug. 5, 2020

(65) Prior Publication Data

US 2021/0194823 A1 Jun. 24, 2021

Related U.S. Application Data (63) Continuation of application No. 16/515,406, filed on Jul. 18, 2019, now abandoned, which is a continuation of application No. 14/670,910, filed on Mar. 27, 2015, now abandoned.

(60) Provisional application No. 61/972,602, filed on Mar. 31, 2014.

(51) Int. Cl.
*G06F 15/16* (2006.01)
*H04L 12/927* (2013.01)
*H04L 29/12* (2006.01)
*H04L 29/06* (2006.01)
(Continued)

(52) U.S. Cl.
CPC .......... *H04L 47/806* (2013.01); *H04L 61/103* (2013.01); *H04L 61/2567* (2013.01); *H04L 65/1026* (2013.01); *H04L 67/025* (2013.01); *H04L 61/2514* (2013.01); *H04L 61/2553* (2013.01); *H04W 40/00* (2013.01)

(58) Field of Classification Search
CPC . H04L 47/806; H04L 61/2567; H04L 67/025; H04L 61/103; H04L 65/1026; H04L 61/2553; H04L 61/2514; H04W 40/00
See application file for complete search history.

(56) References Cited

U.S. PATENT DOCUMENTS

| | | | |
|---|---|---|---|
| 8,289,978 B2 * | 10/2012 | Chase | H04L 12/1836 370/400 |
| 9,167,275 B1 * | 10/2015 | Daily | H04N 21/6125 |
| 2003/0062997 A1 | 4/2003 | Naidoo | |

(Continued)

*Primary Examiner* — Hieu T Hoang
(74) *Attorney, Agent, or Firm* — Fish & Richardson P.C.

(57) ABSTRACT

Method and apparatus for facilitating accessing home surveillance device data, preferably an IP camera video stream, by a remote user device at the remote user device's instigation, over the Internet through a home router, the facilitating including incorporating a smart gateway in local communication with the home router and in persistent or intermittent communication with a remote Internet server to facilitate communication of data over the Internet at the remote user device's request through direct communication between the remote user device and the smart gateway, the smart gateway in local communication with the home surveillance device such as an IP camera, the direct communication facilitated by a "hole punch" type of technique.

12 Claims, 8 Drawing Sheets

(51) Int. Cl.
*H04L 29/08* (2006.01)
*H04W 40/00* (2009.01)

(56) References Cited

U.S. PATENT DOCUMENTS

| | | | |
|---|---|---|---|
| 2004/0117462 A1* | 6/2004 | Bodin | H04L 41/0843 709/220 |
| 2006/0161960 A1* | 7/2006 | Benoit | H04L 12/2807 725/105 |
| 2006/0279628 A1* | 12/2006 | Fleming | H04N 21/4223 348/143 |
| 2008/0013555 A1* | 1/2008 | Kamimaki | H04L 65/1026 370/401 |
| 2009/0070682 A1 | 3/2009 | Dawes | |
| 2009/0129301 A1* | 5/2009 | Belimpasakis | H04W 28/18 370/310 |
| 2010/0217837 A1* | 8/2010 | Ansari | H04L 41/12 709/218 |
| 2011/0032843 A1* | 2/2011 | Papp | H04L 45/50 370/254 |
| 2014/0129713 A1 | 5/2014 | Ylimartimo | |

\* cited by examiner

METHOD AND APPARATUS FOR FACILITATING ACCESSING HOME SURVEILLANCE DATA BY REMOTE DEVICES

This application is a continuation of U.S. application Ser. No. 16/515,406, filed Jul. 18, 2019, which claims priority to and is a continuation of U.S. application Ser. No. 14/670,910, filed Mar. 27, 2015, which relates to and claims priority to U.S. provisional application Ser. No. 61/972,602, filed Mar. 31, 2014. The content of the referenced continuation application and provisional application are herein and hereby incorporated by reference in their entireties.

FIELD OF THE INVENTION

The invention is directed to the home security space and more particularly, in a preferred aspect, to the installation of a remote server on the Internet and a smart gateway in communication with a home router on a home premises, in order to provide a cost effective method and system for conveying preferably live home security data, such as IP camera data, to remote user devices upon a remote user device's request. (Home as used herein means residence or small business. The home router is also referred to as a customer router.)

The instant invention preferably provides the home security data without having to perform port forwarding on, or pre-configuring of, a home router. Utilizing a smart gateway and a remote Internet server can eliminate the necessity of training installers to perform the requisite port forwarding on, or preconfiguring of, a variety of home routers in order to translate addresses. Such address translation through a router is typically regarded as necessary in order to provide a direct link to a home security device from a remote user device. This elimination of training of installers by the instant method and system can provide a significant cost savings as well as additional security. For instance, installers need not be given the access code to a customer's router nor a customer's web portal user address and password. By using a remote Internet server and smart gateway to implement the instant method and system, security camera data can be remotely accessed through a variety of home routers by remote user devices, upon the remote user device's instigation, without requiring port forwarding or pre-configuring to be performed or to exist on the home router.

BACKGROUND OF THE INVENTION

The invention preferably establishes direct Internet UDP communication between a remote user device and a smart gateway upon the remote device's request, with the smart gateway connected locally to a home router and, directly or indirectly, to other local devices, typically by communication through the home router. A smart gateway preferably secures and forwards indicated data directly to the remote user device over the Internet through UDP communication. An IP camera represents an exemplary local source of the requested data, the camera typically providing video data and having API capability. Remote user devices typically desire essentially live access to video streams from such sources, upon request.

The Internet communication between a smart gateway and a remote user device is preferably established by the invention through a customer's home router, again upon the remote device's request, without having to pre-configure the home router or implement port forwarding. As stated above, performing pre-configurations or port forwarding is specific to each home router and can represent a high cost in time and training for installers, requiring them to learn how to properly translate addresses for a variety of home routers. Such preconfiguring or port forwarding can also result in security risks for customers.

In discussing the preferred embodiments below, a customer's home IP camera may be used as exemplary of an important source of home surveillance data that is desired to be accessed live by a remote user device upon request. A typical IP camera hosts an HTTP server, provides certain limited API capability and may have a static IP address. Static IP address can function as the camera's local LAN address. Alternatively, each IP camera has a known Media Access Control (MAC) address. The smart gateway could perform an Address Resolution Protocol (ARP) scan on a local network, and discover the IP address of a camera with a known MAC address. This embodiment offers the additional advantage that the installer does not need to know the IP address of the camera, because the smart gateway can discover it automatically.

Accessing such camera data by a remote user device can typically be performed by using an HTTP GET Request with URI format addressing a specific camera's LAN W address (which address could be derived through a MAC address, as indicated.) However again, such previously has required performing a pre-configuring or a port forwarding on the local home router.

With the invention, the accessing is preferably performed without the necessity of having to perform port forwarding on, or preconfiguring of, the home router. Rather video content or other data can be locally accessed by a local smart gateway connected to the home router. The local access is typically through the home router but optionally can be otherwise. The smart gateway uses an Internet connection with, and the assistance of, a remote Internet server, preferably in order to learn of the request and to implement direct Internet communication with the remote user device. The connecting technique for achieving the direct Internet communication is sometimes referred to as a "hole punch" type of technique performed to traverse a router.

Basic Background

Typically, home Internet service providers (ISPs) assign an IP address to a customer's Internet connection. To allow multiple devices at a customer premises to communicate across the Internet, the customer's Internet connection is typically terminated by a home router capable of Network Address Translation (NAT) in order to provide Internet communication with a plurality of locally connected devices. The typically assigns devices at the customer's premises, such as IP cameras configured as HTTP servers, local addresses on a Local Area Network (LAN).

If a message were to be sent from a device on such a LAN destined for an Internet host outside the premises, the NAT router would store information about (1) the device source address and/or port and (2) the destination address and port. The router would forward the message to the Internet (typically changing the source address to the router external address as assigned by the ISP.) When a message comes in to the router from the Internet, the destination address and/or port (possibly after translation from a MAC identification) is compared with the stored information. If the router 1) recognizes the message as a "reply" to a previous message sent from a device on the LAN [or 2) if the router has been "pre-configured" to forward requests for a particular device to a particular local address,] the router sets the destination address of the message to the local address and/or port of that device. Otherwise the incoming message is dropped. Typically, incoming messages from the Internet that are not "replies" are unable to reach a device on the LAN unless the router has been "pre-configured" in advance to forward requests for a particular device to the device's local address.

OBJECTIVE OF INVENTION

It is desirable to provide a means by which an installer of home security devices, especially IP cameras, can install and enable secure communication over the Internet, at a remote user device's instigation, between a remote user device and a security device through a home router without having to port forward or "pre-configure" the router in advance to forward requests for a particular device to a local address.

The instant invention provides a means to secure such objective by preferably connecting a "smart gateway" to a customer's home router, which smart gateway could of course provide additional functionality, and by using a remote Internet server and a type of "hole punch" technique to establish direct Internet communication between the smart gateway and the remote user device, at the remote device's request. By connecting the smart gateway locally with the requested source of data, it is possible to stream video, for instance, from a home IP surveillance camera to a remote user device, at the remote user device's request, through the smart gateway and through the home router directly to the remote user device without requiring an installer to port forward or "pre-configure" the home router. (The remote Internet server also may provide other functionality for the system.)

A Preferred Smart Gateway

A preferred smart gateway: 1) includes a processing unit and a memory; 2) is connected to communicate directly or through a home router with home surveillance devices and to communicate with the Internet through a customer's home router; 3) is structured and/or programmed to participate in a persistent or intermittent connection with a remote Internet server through the router, preferably to establish the communication; 4) is structured and/or programmed to respond to a data request (possibly by forwarding a GET request) as indicated by the remote Internet server and to receive data from an identified local source, such as an IP surveillance camera data, using some local area network, typically through the router; 5) is structured to transmit a UDP message to the remote Internet server and to receive at least current remote user device port information; 6) and is structured and/or programmed to stream indicated data, such as a video stream obtained locally from the identified local device such as an IP camera, to the remote user device using at least the received remote user device port information.

For local communication behind the router, preferably a home surveillance device such as the IP camera has an assigned static IP address. Alternatively, each IP camera has a known Media Access Control (MAC) address. The smart gateway could perform an Address Resolution Protocol (ARP) scan on a local network, and discover the IP address of a camera with a known MAC address. This embodiment offers the additional advantage that the installer does not need to know the IP address of the camera, because the smart gateway can discover it automatically.

A Preferred Embodiment of the Process

To preview a preferred embodiment of the process of the invention in a general example with a time sequence, an app of a remote user device, through the remote user device's Internet Service Provider, forms an Internet connection with a remote Internet server. Over that connection the app of the remote user device issues a request for a communication of data from a particular home device (certified by the app) such as an IP surveillance camera at the home premises. The remote Internet server identifies a smart gateway associated with the home or particular device or camera and using a persistent or intermittent connection established between the remote Internet server and the smart gateway, the remote Internet server commands the smart gateway to connect to the requested device (such as by submitting a GET request to the local home surveillance device) to secure the requested local data. The remote user device and smart gateway both transmit a UDP message to the remote Internet server. The remote Internet server extracts at least source port information from each source and forwards the information to the other. The smart gateway and remote user device each initiate UDP communication with the other based at least on the supplied IP port information.

That is, the smart gateway begins sending Internet UDP messages to the remote user device using at least the remote device port information provided by the remote Internet server and the remote user device (through an app) begins sending UDP messages to the smart gateway using at least the smart gateway port information provided by the remote Internet server.

The remote user device and the smart gateway are each communicating on the Internet through the routers. Routers in general, as explained above, absent preconfiguring, will drop messages sent either by the smart gateway or remote user device not recognized as a "reply." However, messages subsequent to the initial messages will be accepted and direct communication will be established, as a subsequent message is recognized by a router as a "reply" to a prior outgoing message. This is true even if the outgoing message was dropped by the receiving side.

Once direct Internet communication is established between the smart gateway and the remote user device, the smart gateway will continuously communicate image frames or the like directly to the remote user device as UDP messages, and the remote user device will assemble the image frames received from the smart gateway and render them to the user as a video stream. The remote user device keeps the communication alive by responses to the smart gateway.

The instant solution provides nearly universal functionality and scales well because the demand on the remote Internet server is small and increases little as the number of system users increases. Installers are not required to perform pre-configurations specific to each customer's router, which lowers training costs and reduces the time required to perform installations. Without the instant solution, the installer must be well versed in network configuration topics. Further, security is increased by limiting an installer's access to specific confidential home network access information. Furthermore, other functionalities may utilize the existence of the remote Internet server and/or the smart gateway.

An alternate solution to the instant invention would be to utilize UPnP (universal plug and play) configuration, which is a standardized method of performing port-forwarding configuration on a router. This alternate solution has the drawback, however, that UPnP configuration is not supported by every router. Even on routers that do support it, it is not enabled by default in every case. Further, training installers to enable UPnP still involves special configurations that are unique to each customer premises. Avoiding this requirement is a goal of the invention.

Another alternate solution to the instant invention is to perform a server-based video stream proxy. In this solution instead of forming a direct connection between a smart gateway and a remote user device, the smart gateway transmits the video content to the remote Internet server, and the remote Internet server transmits the video content to the remote device. This method has the benefit of truly universal functionality but has the drawback of a much higher cost, because the demand on the remote Internet server scales linearly with the number of system users.

GENERAL SUMMARY OF PROBLEM AND PREFERRED SOLUTION

The invention solves problems in the field of home security and more particularly in apparatus and methods for facilitating communicating home surveillance data, epitomized by home video camera data, over the Internet to remote user devices upon remote user device request. An objective of the invention is to provide the cost effective, reliable communication of the home surveillance data without requiring a typical pre-configuring of, or port forwarding on, a home router which connects between an Internet wide area network (WAN) and a local home network (LAN). A smart gateway is added to the local network behind the router and is connected to the home surveillance devices, likely through the same LAN. A remote Internet server is placed in persistent or intermittent connection with the smart gateway.

As previously discussed, for communicating over the Internet through routers, one of two processes is followed by the router. For security inbound communication from an Internet source, to a local device, either (1) the Internet source sender must be recognized as sending a "reply" to a previous message sent outbound through the router from the local device or (2) a router network address translation (NAT) table or port forwarding (PF) system or the like must be implemented to pre-configure the router to make the connection between the outside source and the local device.

To eliminate the burden of having to develop the skills to pre-configure a variety of home routers, the invention inserts a local "smart gateway" on the LAN and a remote Internet server on the WAN. The smart gateway can initiate and keep alive communication with the remote Internet server through the router and can communicate locally through the router or otherwise with home surveillance data providers, such as cameras.

In preferred embodiments the smart gateway participates in, and preferably establishes and maintains, a persistent or intermittent Internet connection with the remote Internet server. As a result, the smart gateway can respond to requests for data forwarded to the smart gateway from a remote user device through the Internet server and through the home router. In response to a remote device data request, the smart gateway might send a GET Request or the like to the indicated local home surveillance data provider, preferably as a HTTP "server." The smart gateway itself secures the data locally and forwards the data directly to the remote user device, presuming establishment of direct Internet communication thereto.

The direct Internet communication between the smart gateway and the remote user device is established, at the device's instigation, through each remote user device sending a UDP message to the remote Internet server and each learning thereby from the remote Internet server at least the port information of the other device. The devices then utilize the routers' "reply" processes as discussed above. Such is significantly more cost effective, reliable and secure than a variety of pre-configuring alternatives. As a result the smart gateway responds to requests for data originating from a remote user device and passes through the results of its own "local" request for data over direct UDP communication.

Looked at in overview, a smart gateway functions as a "client" and participates in a persistent or intermittent Internet connection with a remote Internet server. Through the Internet server connection the smart gateway learns of a request for data, and in response secures a set of local data. The remote Internet server facilitates the smart gateway's and remote user device's establishing direct Internet communication between themselves by extracting at least port information from UDP communications from each and forwarding the information to the other. If and when each begins messaging the other repeatedly using the forwarded information, an initial attempt at communication will be dropped but subsequent attempts will be interpreted as "replies" by the router and direct communication will be effected. This process avoids the necessity of having to pre-configure NAT tables or perform port forwarding or the like upon various and sundry home routers. It provides a more cost effective, secure and reliable communication link between a home surveillance data provider and a remote user device.

SUMMARY OF THE INVENTION

In an important aspect, the invention preferably includes a smart gateway for facilitating accessing home surveillance data by a remote user device over the Internet. The smart gateway preferably includes a processing unit and a memory and is preferably connected to communicate directly or indirectly with a home surveillance device and to communicate with the Internet through a home router. (Note: the ensuing phrase "structured and/or programmed" is used to indicate that the amount of structure and the amount of programming can vary and may be a design choice.) The smart gateway is preferably structured and/or programmed to participate in direct Internet communication with a remote user device including participating in a persistent or intermittent connection with a remote Internet server; transmitting a UDP message to the remote Internet server; receiving at least remote user device IP port information from the remote Internet server; accessing home surveillance data from an indicated home surveillance device; and streaming by UDP accessed data over the Internet using at least the received IP port information.

The invention preferably includes a remote Internet server for facilitating directly accessing by a remote user device, over the Internet, home surveillance data through a home router. The remote Internet server preferably includes a processing unit and a memory and is structured, connected and/or programmed to participate in a persistent or intermittent Internet connection with a smart gateway through a home router, the smart gateway in local communication with a home surveillance device. The remote Internet server is further preferably structured, connected and/or programmed to communicate over the Internet with a remote user device. The remote user device preferably has an Internet service provider and an app. The remote Internet server is preferably further structured, connected and/or programmed to extract from a UDP communication at least remote user device IP port information and to forward the information to the smart gateway and to extract from a UDP communication at least smart gateway IP port information and to forward the latter information to the remote user device. The remote Internet server is further preferably structured, connected and/or programmed to forward to the smart gateway an indication received from the remote user device of data desired from an indicated home surveillance device.

The invention also preferably comprises a remote user device app for viewing surveillance data from a surveillance device located on proprietary premises having a home router and a smart gateway. The remote device app is preferably structured and/or programmed to transmit over the Internet to a remote Internet server a request for home surveillance data from an indicated home surveillance device; to transmit a UDP message to the remote Internet server; to receive at least IP port information of the smart gateway from the remote Internet server; to establish and keep alive direct Internet communication with the smart gateway by transmitting UDP messages to the smart gateway using at least the received IP address port information; and to receive UDP video feed from the smart gateway.

The invention preferably includes a process for facilitating, by a smart gateway, accessing home surveillance data by a remote user device over the Internet, the smart gateway having a processing unit and a memory and being locally connected directly or indirectly to a home router and to a home surveillance device. The method preferably includes the smart gateway participating in a persistent or intermittent Internet connection with a remote Internet server through the home router; accessing data from an indicated home surveillance device over a local connection; and establishing direct Internet communication with the remote user device through the home router using at least remote user device IP port information communicated to the smart gateway by the remote Internet server. The establishing preferably includes the smart gateway transmitting a UDP message to the remote Internet server and receiving at least current remote user device IP port information from the remote Internet server and streaming the accessed data through the home router to the remote user device using at least the received remote user device IP port information.

The invention preferably includes a process for facilitating accessing over the Internet home surveillance data from a home premises by a remote user device including a remote Internet server having a processing unit and memory and being connected to the Internet. The process preferably includes the remote Internet server participating in a persistent or intermittent Internet connection with a smart gateway at the premises through a home router, the smart gateway in local communication with a home surveillance device. The process preferably includes the remote Internet server communicating over the Internet with a remote user device having an Internet Service Provider and an app. The invention preferably includes the remote Internet server extracting from a UDP communication at least remote user device IP port information and forwarding the information to the smart gateway and extracting from a UDP communication at least smart gateway IP port information and forwarding the latter information to the remote user device. The process preferably includes forwarding to the smart gateway an indication received from the remote user device of data desired from an indicated home surveillance device.

The invention preferably includes a process for viewing surveillance data from a home surveillance device, the surveillance device located on proprietary premises and in local communication with a home router and a smart gateway. The process preferably includes, by an app of the remote user device, initiating an Internet connection with a remote Internet server and indicating a request for surveillance data from an identified home surveillance device; receiving at least current IP port information of the smart gateway from the remote Internet server; and participating in direct Internet communication with the smart gateway through the home router by UDP messaging using at least the received current smart gateway port information.

BRIEF DESCRIPTION OF THE DRAWINGS

A better understanding of the present invention can be obtained when the following detailed description of the preferred embodiments are considered in conjunction with the following drawings, in which:

FIG. 2 shows the interaction of hardware with further annotation.

The drawings are primarily illustrative. It would be understood that structure may have been simplified and details omitted in order to convey certain aspects of the invention. Scale may be sacrificed to clarity.

DETAILED DESCRIPTION OF PREFERRED EMBODIMENTS

Preferred Video Streaming from an IP Camera, for Example, to a Smart Gateway and, by UDP Hole Punch, Through a Home Router and Over the Internet to a Remote User Device Upon User Device Request Preferred Requirements;

IP Camera HSD

A camera capable of supplying a video stream over an IP network, in response to an IP request.

Customer Premises Home Router CR

A router at the customer premises which does the following:
  Connects to the Internet
  Performs Network Address Translation for connecting devices connected to a Local Area Network at the Customer Premises with the Internet.

There are no other special requirements upon the Customer Premises Router. E.g., the router is not required to perform port forwarding and it is not required to support uPnP. This distinguishes the instant invention.

Smart Gateway SG

A device consisting of at least the following components:
  Processing Unit
  Memory The smart gateway is preferably capable of sending and receiving IP frames. The smart gateway is not required to have an external IP address or any ports forwarded to it from the customer premises router and can have a dynamic address. The device preferably communicates, over IP, locally with a camera and over the Internet with a remote Internet server. In preferred embodiments, the smart gateway is a device with a 32-bit Microcontroller, and at least 128 Kilobytes of memory.

Remote Internet Server RIS

A computer with an external IP address, capable of IP communications. This remote Internet server preferably runs software which supports communications with the smart gateway and a remote user device in the following ways:

Receives a command from the remote user device to initiate an indicated video session Sends a command to a smart gateway to initiate a video session Receives an Internet UDP message from the remote user device and from the smart gateway and reads at least the source IP port of these messages Sends at least the IP port information of the smart gateway to the remote user device and sends at least the IP port information of the remote user device to the smart gateway A preferred embodiment includes a computer running the Linux operating system with a database, a web server, and an application which manages the communications to and from the remote user device and the smart gateway. In this embodiment, the web server is used to allow users to manage their login credentials, to register their smart gateway, and to identify the address by which the smart gateway may communicate with the IP camera on the customer premises.

Remote User Device RUD with an App

A (remote) device with at least the following components:
Processing Unit
Memory
and preferably a
Video Display Furthermore, the remote user device with app is preferably capable of sending and receiving IP frames.

The app on the remote user device is preferably capable of the following:
Accepting a command from the user to request a video stream and
Rendering on its Video Display the video data received from the smart gateway.

A preferred embodiment includes an app for a smartphone SP, such as an iPhone or Android phone.

Figure 1:
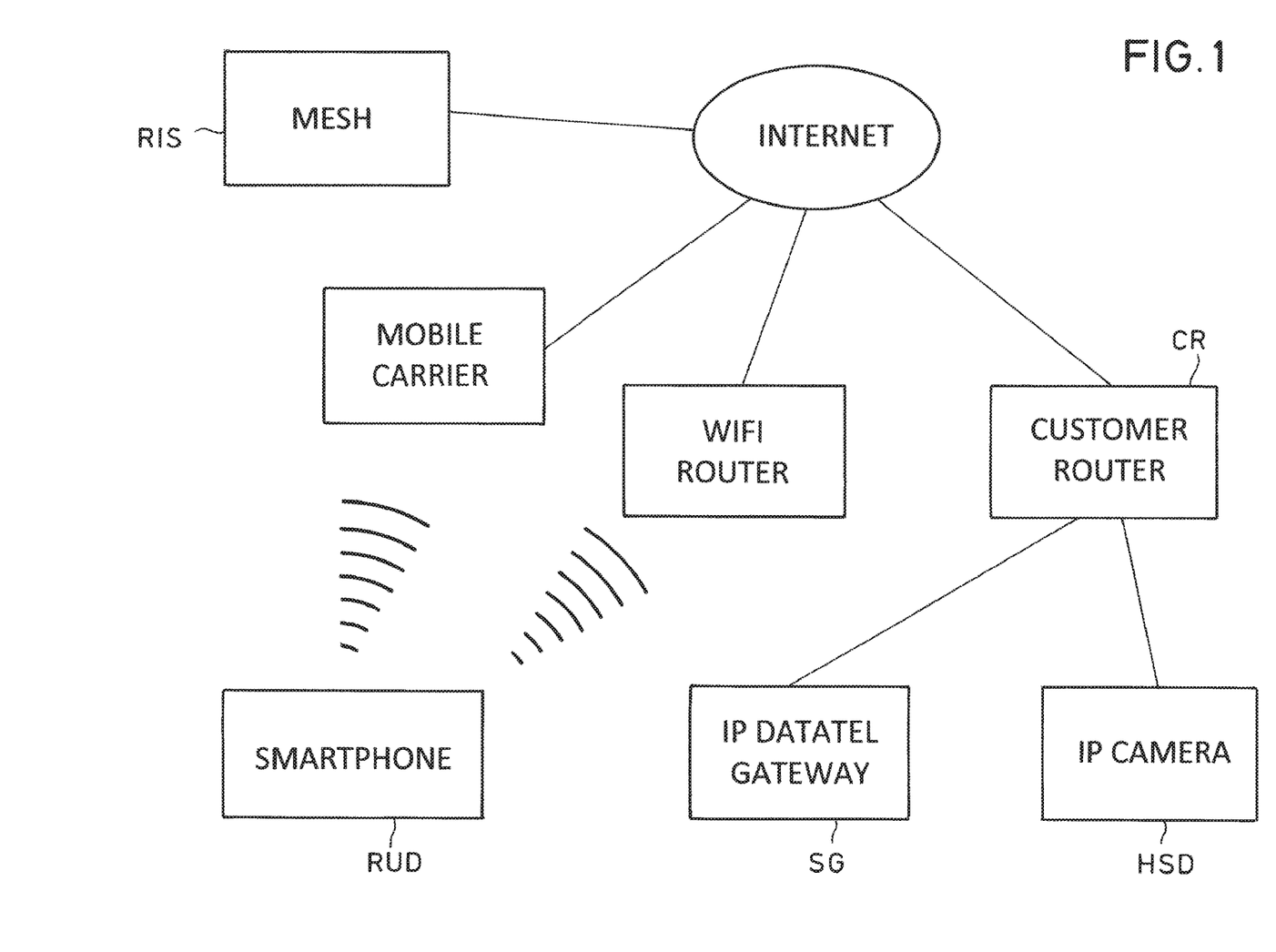
FIGS. 1 and 2 indicate the connectivity between basic elements or pieces of hardware in regard to a preferred embodiment of the instant invention.
Figure 2:
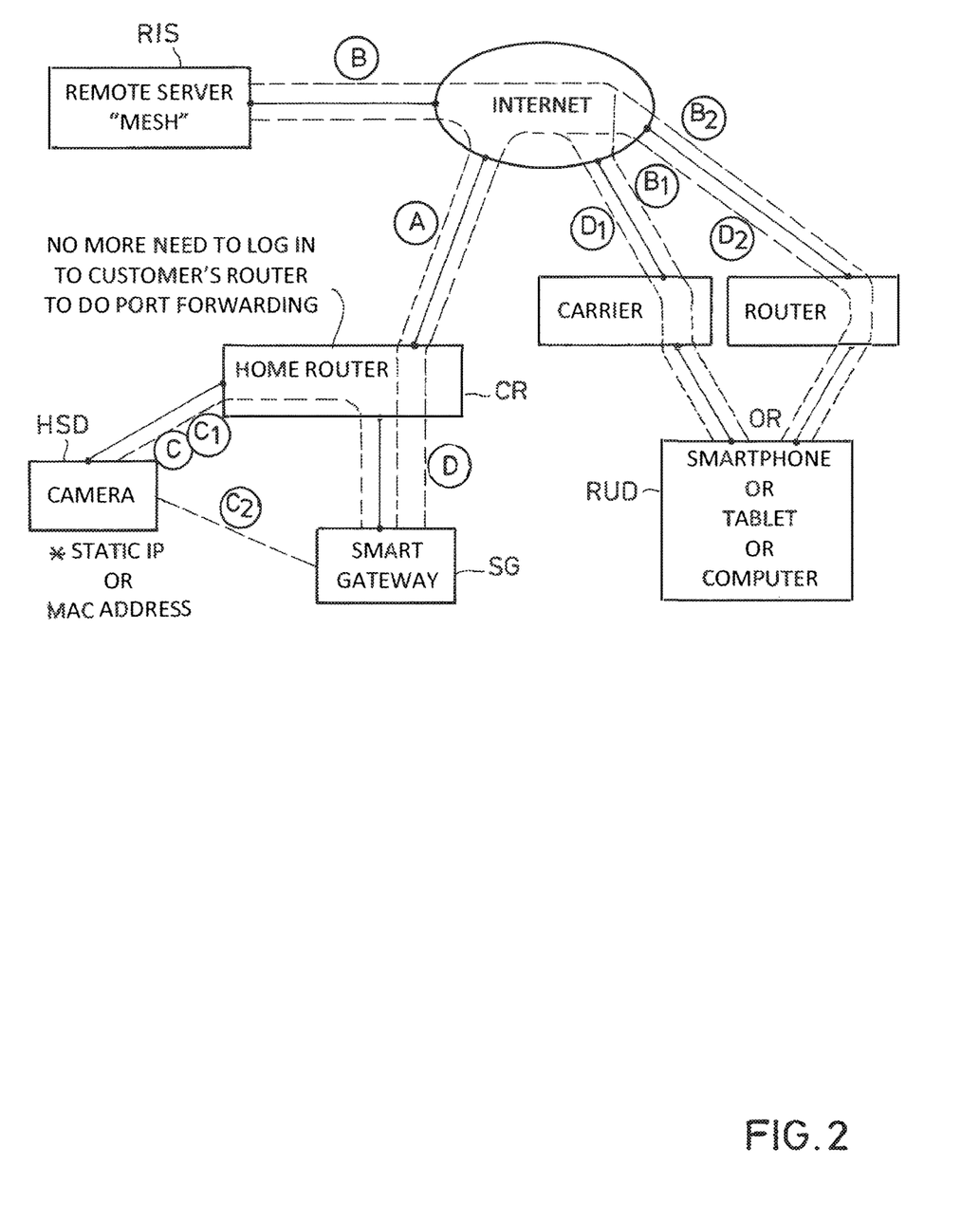

FIGS. 1 and 2 indicate preferred connectivities between basic elements of the invention in regard to preferred embodiments of the instant invention. "Mesh" refers to a remote Internet server RIS and is shown connected to the Internet. The remote user device RUD, such as smartphone SP, is shown connected by mobile carrier or Wi-Fi router WFR to the Internet. The smartphone is a remote user device RUD and hosts an app. FIGS. 1 and 2 also illustrate the customer home router CR connected to the Internet. This connection is usually referred to as a wide area network (WAN). The customer home router is then connected locally to the smart gateway SG and preferably to surveillance cameras IPC. Local connections are typically referred to as being over a local area network (LAN). In a less preferred embodiment, the surveillance cameras or other home surveillance devices could be connected to the smart gateway without connecting through the home router.

FIG. 2 provides a preferred embodiment of the instant invention with further annotation. The remote Internet server RIS, also referred to as "Mesh," is shown connected to the Internet. The remote Internet server Mesh is also shown connected by a preferred persistent connection with the smart gateway SG. Preferably, the smart gateway establishes and maintains this persistent Internet connection. This persistent connection between the smart gateway and Mesh should be understood as proceeding through the Internet and the home premises router.

FIG. 2, like FIG. 1, also illustrates a local area network in which the home premises router is connected to the smart gateway and to home surveillance devices such as preferably IP cameras. In preferred embodiments, the IP cameras have a static IP address. Alternatively, each IP camera has a known Media Access Control (MAC) address. The smart gateway could perform an Address Resolution Protocol (ARP) scan on a local network, and discover the IP address of a camera with a known MAC address. This embodiment offers the additional advantage that the installer does not need to know the IP address of the camera, because the smart gateway can discover it automatically. The connection of the home local area network in FIGS. 1 and 2 could be varied. One variation would be to have home surveillance devices connected directly to the smart gateway.

FIG. 2 also illustrates a preferred feature of the instant invention in that the instant invention avoids a need to login to the customer home router and do network address translation and port forwarding and the like. FIG. 2 further shows the smart gateway, after establishing the IP connection, streaming camera data directly to the customer's remote device or smartphone. The camera data has been streamed from the camera to the smart gateway locally. The indication of the streaming, from the smart gateway to the smartphone directly should be understood to pass through the Internet but not the remote Internet server.

The remote user device need not be a smartphone but, as indicated in FIG. 2, could be a computer or a tablet or other device with sufficient functionality. FIG. 2 also indicates that by not requiring port forwarding to communicate with the smart gateway, the system is more secure.

Figure 3A:
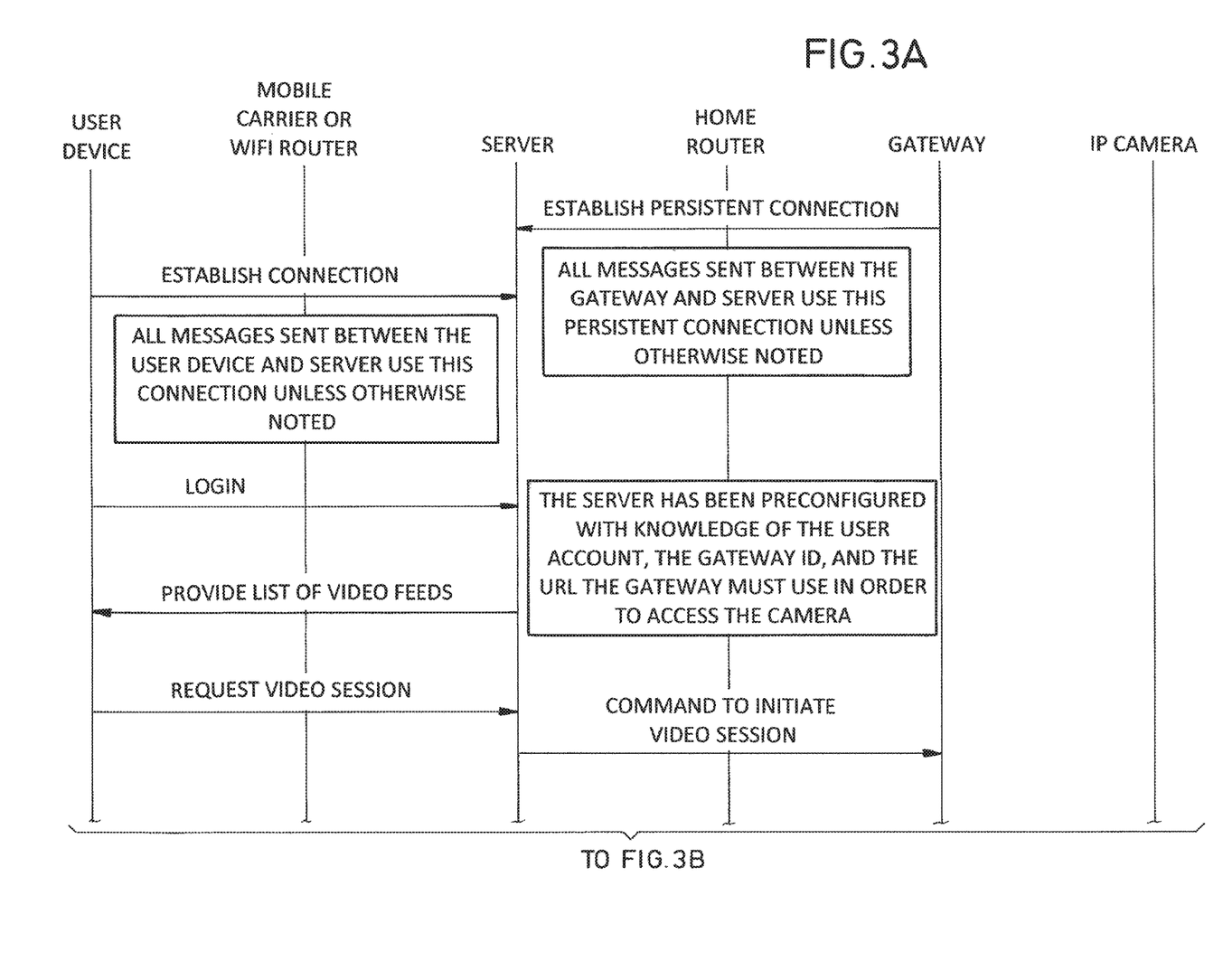
FIGS. 3A-3C and 4A-4C offer sequence descriptions of preferred embodiments of the invention, indicating steps or processes between elements of the invention.
Figure 3B:
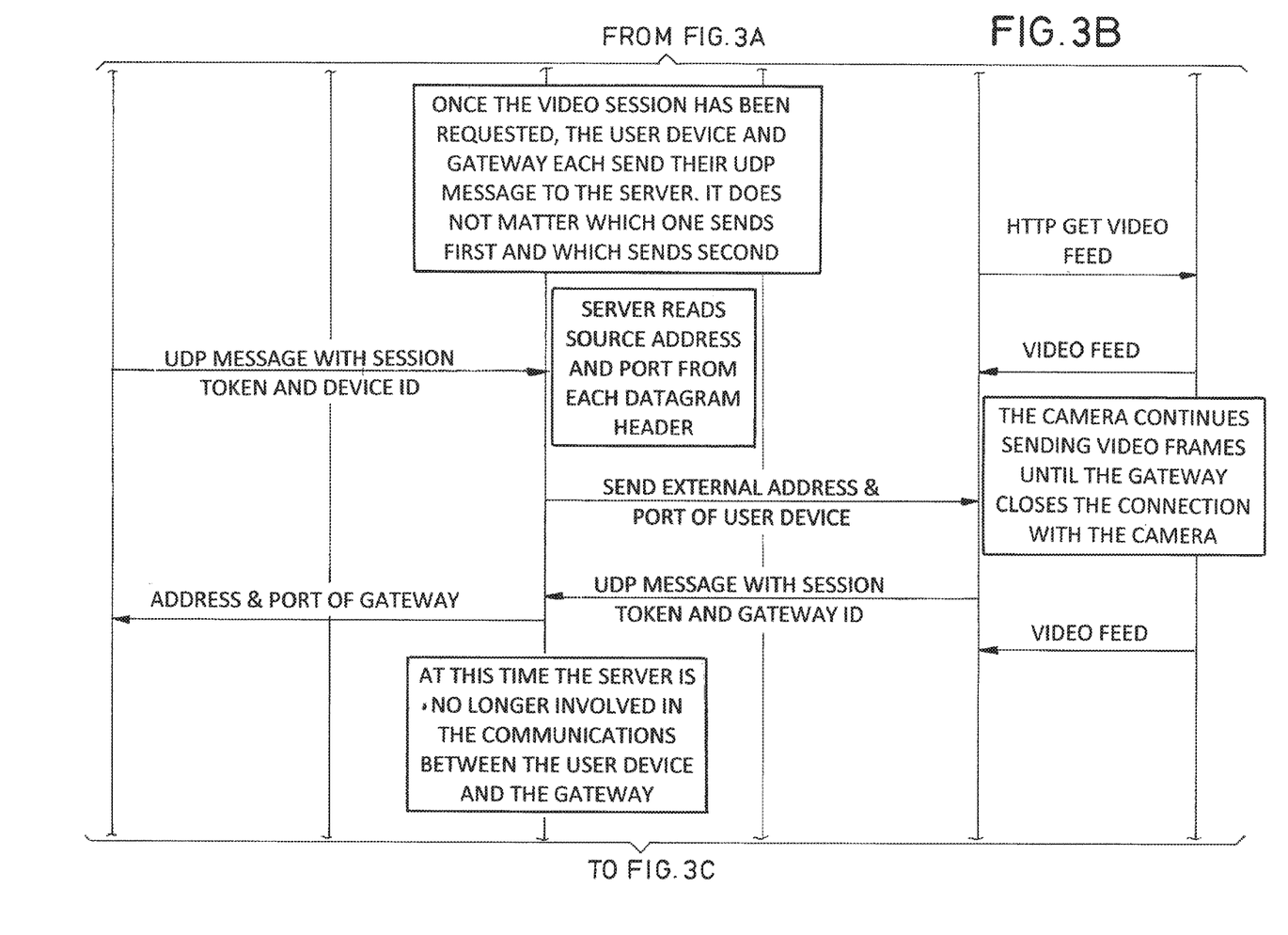
Figure 3C:
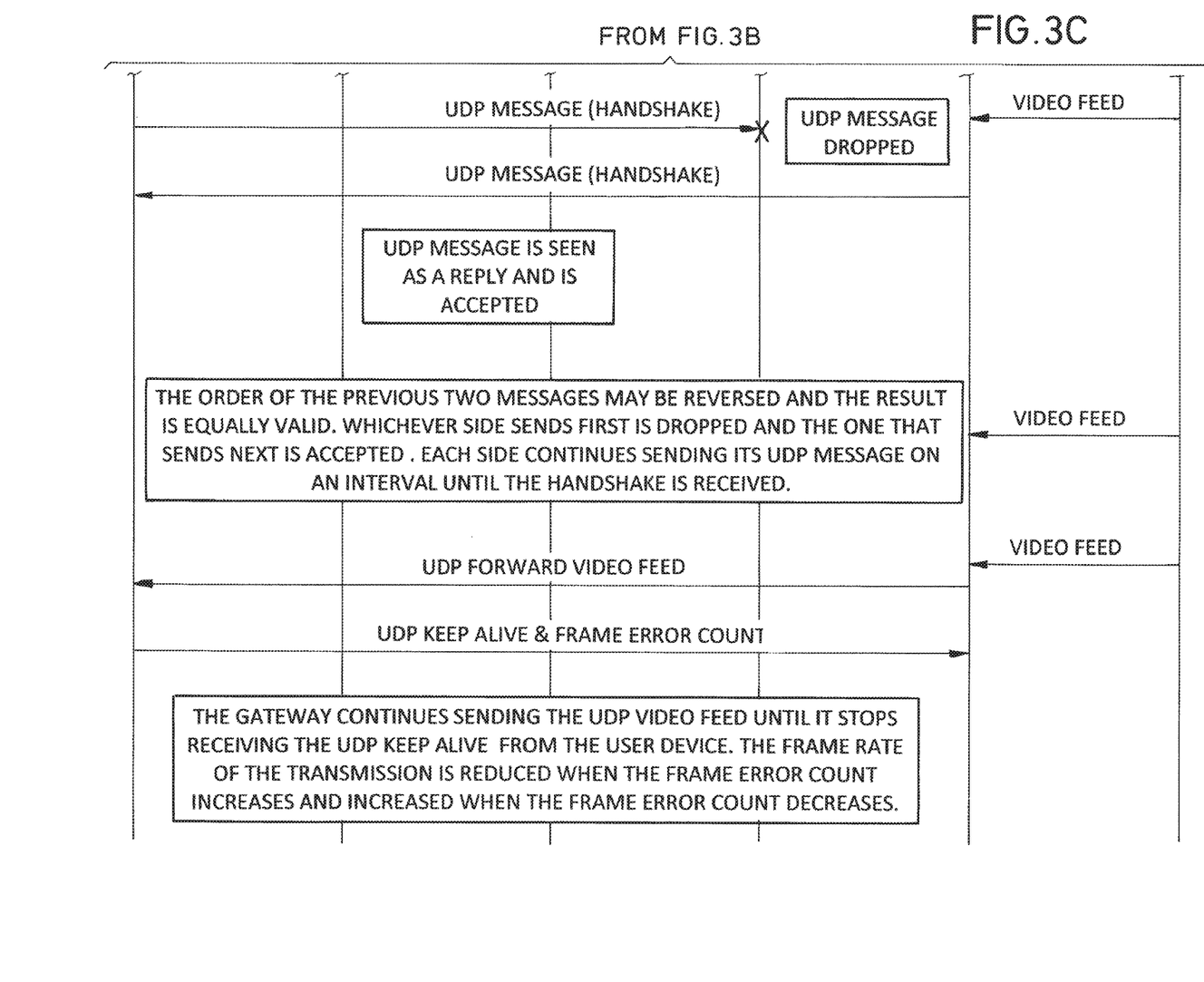
Figure 4A:
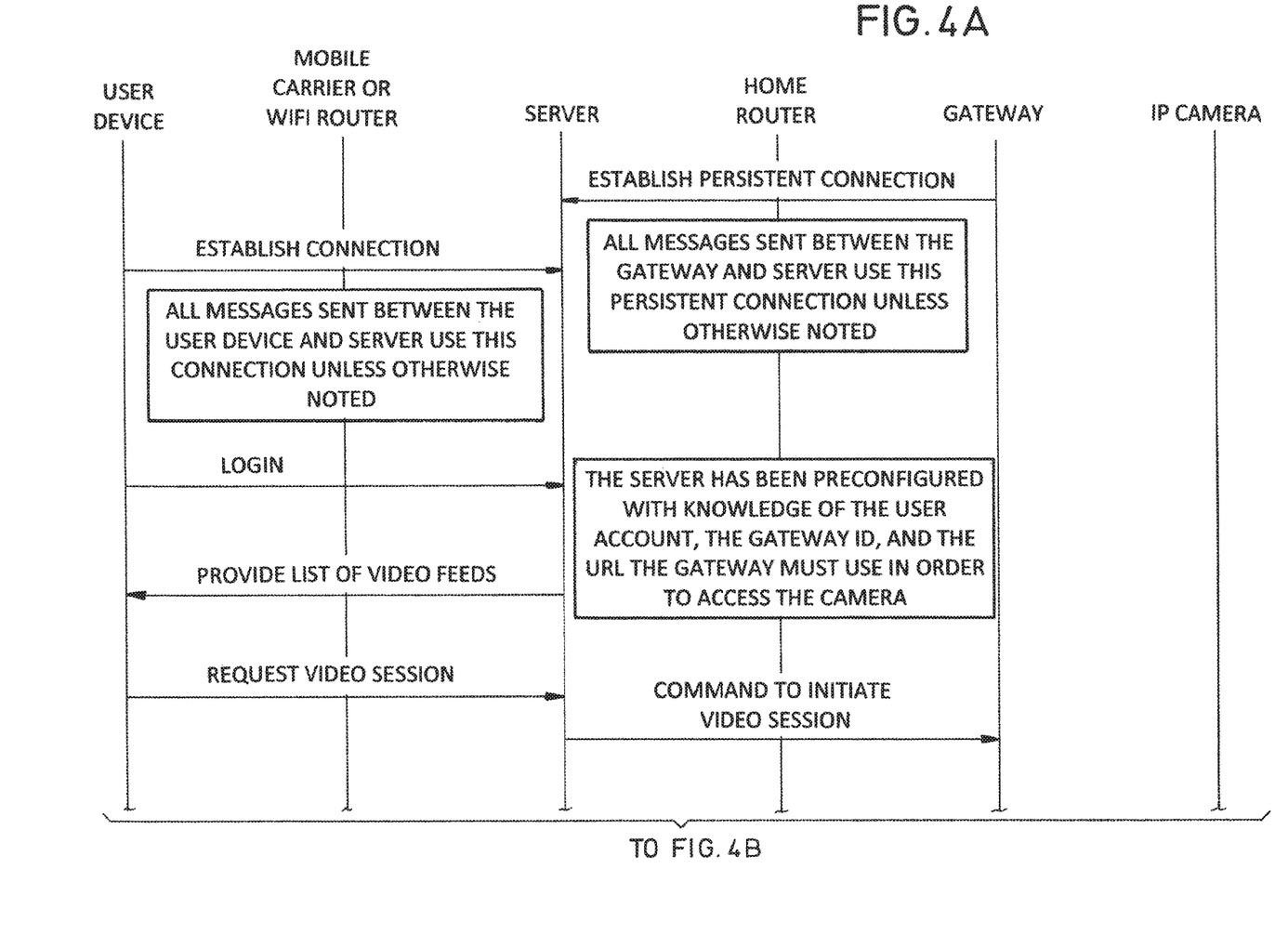
Figure 4B:
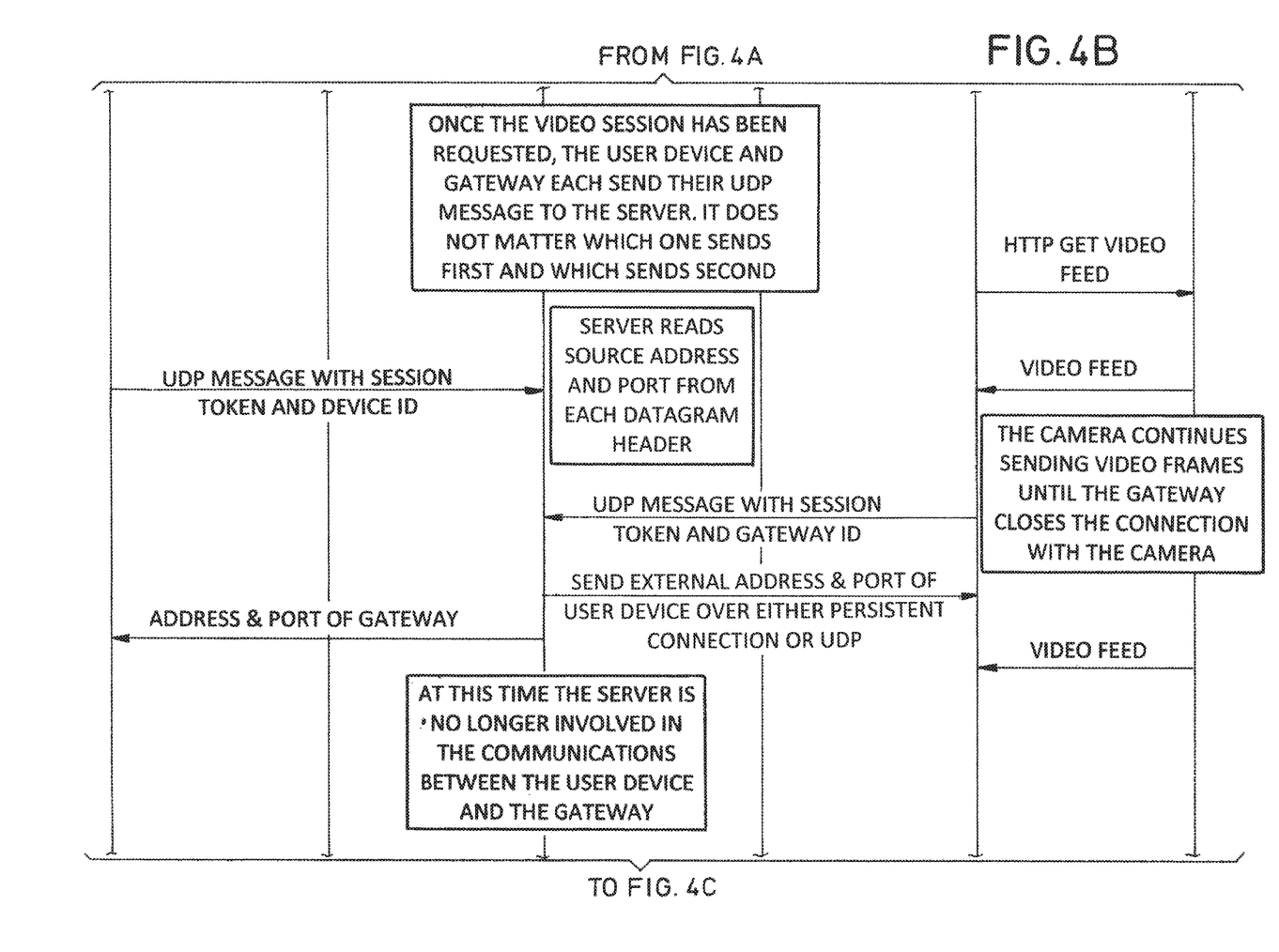
Figure 4C:
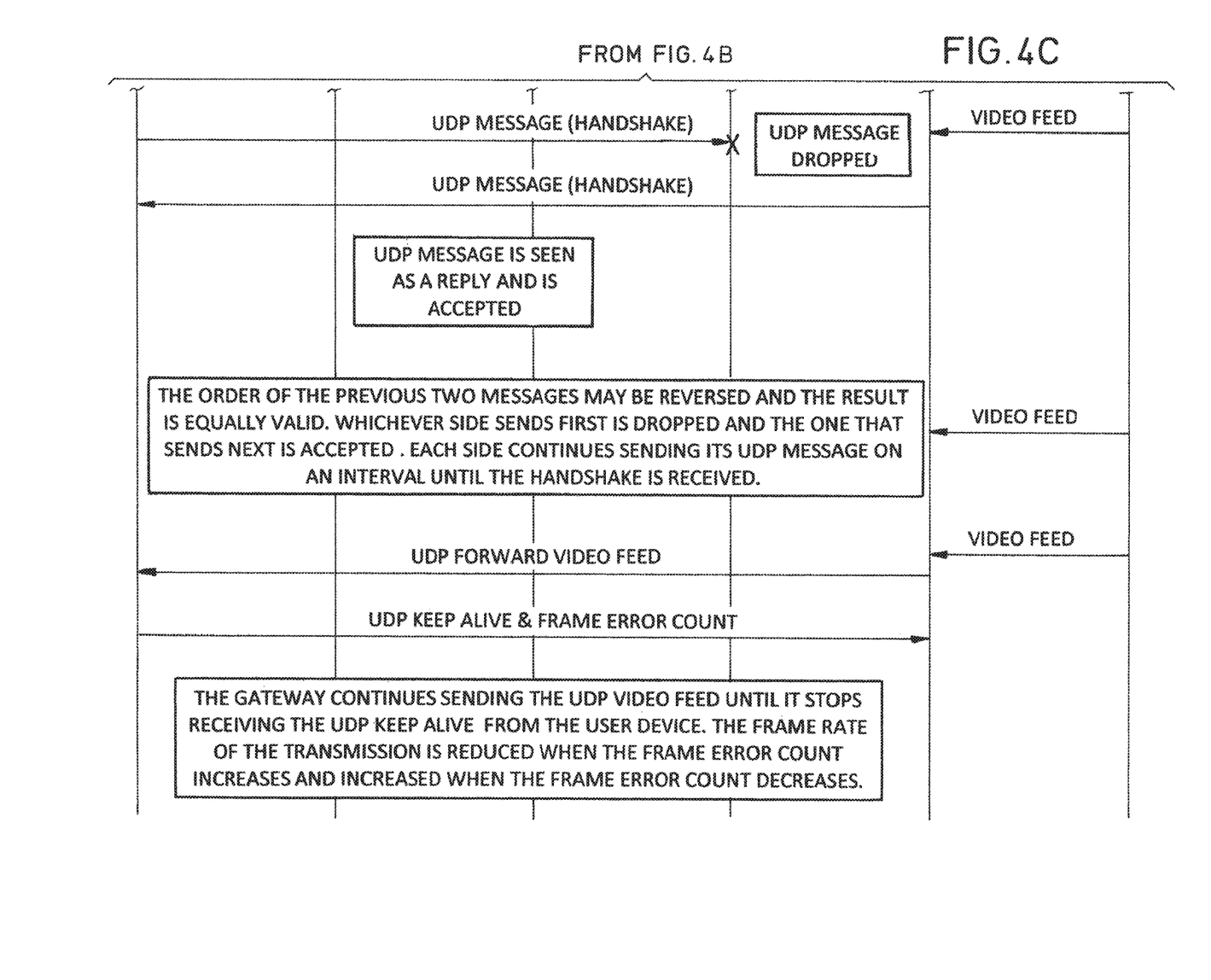

FIGS. 3 and 4 illustrate steps in a preferred embodiment. Note: FIGS. 3 and 4 differ only the order in which RIS receives UDP messages from SG and RUD and in noting that the RUD address and port could actually be forwarded to SG over the UDP connection, if established, or the persistent connection. Further in FIGS. 3 and 4 "persistent" connection should be read to include "intermittent." If SG has sent a UDP message, the RUD address port information can be transmitted to SG over the persistent/intermittent connection or as a reply to the UDP message.

FIGS. 3 and 4 illustrate the existence of a user device, frequently referred to as a remote user device RUD, or a smartphone SP as a preference. FIGS. 3 and 4 also illustrate a mobile carrier or Wi-Fi router servicing the remote user device. FIGS. 3 and 4 illustrate the remote Internet server. FIGS. 3 and 4 illustrate the home router CR as well as the premises smart gateway SA and premises home surveillance device such as, preferably, an IP camera. IP camera is meant to indicate that the camera is preferably configured as a HTTP server.

In the preferred embodiment indicated in FIGS. 3 and 4 the smart gateway connects to the remote Internet server over the Internet through the home router. Preferably, the smart gateway SG maintains the connection alive by establishing a persistent connection between the smart gateway SG and the remote Internet server RS. The smart gateway can said to be function as a client in this respect, where the remote Internet server functions as a server.

FIGS. 3 and 4, in a second step, indicate a remote user device RUD preferably envisioned as a remote user device such as a smartphone or possibly a tablet or a computer. The remote user device can establish a connection with the remote Internet server through the remote user device's mobile carrier or Wi-Fi router or Internet System Provider or the like.

FIGS. 3 and 4 note that messages sent between the smart gateway SG and the remote Internet server RIS preferably use the established persistent or intermittent connection unless otherwise noted. (A "UDP message" will be an otherwise noted message.) Preferably, as indicated in FIGS.

3 and 4, a remote user device RUD logs in with the remote Internet server RIS and preferably the remote Internet server has been pre-configured with knowledge of the user account as well as the premises smart gateway ID and a URL the smart gateway can use to access a local premises camera or other device.

In the preferred embodiment of FIGS. 3 and 4 the remote Internet server RIS preferably provides a list of surveillance data available such as video feeds and the remote user device RUD requests a data session such as a video session. The remote Internet server now preferably commands the smart gateway SG, preferably over a persistent connection, to initiate this video session. The smart gateway SG in response to the command contacts, over some local connection, the appropriate home surveillance data provider, such as an IP camera. Preferably, the smart gateway sends a HTTP GET video feed request and the IP camera responds with video feed to the smart gateway.

As indicated in FIGS. 3 and 4, preferably now that the video session has been requested by the remote user device, the remote user device and the smart gateway each send a UDP message to the remote Internet server. It does not matter which one sends first and which one sends second. The UDP message from the remote user device RUD preferably contains a session token and device ID. The remote Internet server RIS reads at least the source IP port from each datagram header, that is, from the datagram header of the smart gateway to the remote Internet server and from the datagram header of the remote user device message to the remote Internet server.

In order to set up the "hole punch," the remote Internet server RIS sends at least the remote user device IP port information to the smart gateway and the smart gateway IP port information to the remote user device.

FIGS. 3 and 4 indicate that the camera continues sending video frames to the smart gateway, typically until the smart gateway closes the local connection with the camera.

After forwarding at least the smart gateway IP port to the remote user device and the remote user device IP port to the smart gateway, the remote Internet server is no longer involved in the communications.

FIGS. 3 and 4 indicate that both the smart gateway and the remote user device now send UDP messages to each other. The first messages sent will be dropped by the routers as they will not be deemed "replies." However, a subsequent UDP message will be seen as a reply and will be accepted by the appropriate router. This is understood in the industry as part of a hole punch technique. FIGS. 3 and 4 indicate that the order of the messages is not important. The result will occur either way.

Once the UDP communication is achieved the smart gateway continues to forward the video feed from the camera to the remote user device through the home router. Preferably, the remote user device keeps the UDP connection alive and maintains a frame error count by continuing to message back.

As FIGS. 3 and 4 indicate, the smart gateway continues to send the UDP video feed until it stops receiving the UDP "keep alive" from the remote user device. The frame rate of the transmission is preferably reduced when the frame error count increases and the frame rate of the transmission preferably increases when the frame error decreases.

The differences between FIG. 3 and FIG. 4 lie in the arrows indicating the sequencing of messaging between the smart gateway and the remote Internet server to setup the smart gateway side of the hole punch. FIG. 3 indicates that the remote Internet server sends the external address of the remote user device to the smart gateway and the smart gateway sends a UDP message to the remote Internet server with a session token and a smart gateway ID. FIG. 4 indicates that the smart gateway first sends a UDP message with session token and smart gateway ID to the remote Internet server and the remote Internet server now sends the external address and port of the remote user device over either the persistent connection with the smart gateway or the above referenced new UDP connection.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption, that recitation of a single element covers one or more, and recitation of two elements covers two or more, and the like. Also, the drawings and illustration herein have not necessarily been produced to scale.

The invention claimed is:

1. A method for operating a smart gateway located at a home under surveillance to stream video to an app hosted on a remote user device, wherein the smart gateway has associated Internet Protocol (IP) port information and is coupled to an IP camera and a home router at the home under surveillance, and the remote user device has associated IP port information, the method comprising:

establishing an Internet connection with a remote Internet server, wherein the Internet connection is established through the home router;

receiving a command to initiate a video session with the IP camera, wherein the command is received through the home router from the Internet server over the established Internet connection, and is in response to a request for a streaming video session issued by the app of the remote user device;

transmitting a Uniform Datagram Protocol (UDP) message, wherein the UDP message is transmitted through the home router to the Internet server over the established Internet connection and includes the smart gateway IP port information;

receiving the remote user device IP port information, wherein the remote user device IP port information is received through the home router from the Internet server over the established Internet connection;

receiving streamed video data from the IP camera and processing the received streamed video data into UDP video messages;

transmitting the UDP video messages to the remote user device using the received remote user device IP port information, wherein the UDP video messages are transmitted through the home router and over the Internet, and not through the remote Internet server;

receiving UDP keep alive messages while transmitting the UDP video messages, wherein the UDP keep alive messages are received through the home router and over the Internet from the remote user device using the smart gateway IP port information, and wherein the Internet server is not involved in communications of the UDP keep alive messages; and wherein the method is performed without performing port forwarding on or pre-configuration of the home router.

2. The method of claim 1 and further including ending the transmission of the UDP video messages when receiving the UDP keep alive messages stops.

3. The method of claim 1 wherein:

the smart gateway is configured to provide a plurality of video feeds;

receiving the command to initiate the video session includes receiving a command to initiate a video session corresponding to one of the plurality of video feeds; and transmitting the UDP video messages includes transmitting UDP video messages for the video session corresponding to the one of the plurality of video feeds.

4. A method for operating an Internet server to initiate transmission of streamed video from a smart gateway to an app hosted on a remote user device, wherein the smart gateway is located at a home under surveillance, has associated Internet Protocol (IP) port information, and is coupled to an IP camera and a home router at the home under surveillance, and the remote user device has associated IP port information, the method comprising:

establishing an Internet connection with the smart gateway, wherein the Internet connection is established through the home router;

receiving a request to initiate a streaming video session with the home under surveillance, wherein the request is issued by the app of the remote user device;

transmitting a command to initiate a video session between the IP camera and the smart gateway to the smart gateway, wherein the command is transmitted over the established Internet connection and through the home router;

receiving a Uniform Datagram Protocol (UDP) message from the smart gateway, wherein the UDP message from the smart gateway is received over the established Internet connection and includes the smart gateway IP port information;

extracting the smart gateway IP port information from the UDP message received from the smart gateway;

transmitting the extracted smart gateway IP port information to the app of the remote user device, to enable the remote user device to transmit UDP keep alive messages to the smart gateway over the Internet using the smart gateway IP port information;

receiving a UDP message from the remote user device, wherein the UDP message from the remote user device includes the remote user device IP port information;

extracting the remote user device IP port information from the UDP message received from the remote user device;

transmitting the extracted remote user device IP port information to the smart gateway, to enable the smart gateway to transmit UDP video messages to the remote user device using the remote user device IP port information, wherein the extracted remote user device IP port information is transmitted over the established Internet connection;

wherein the Internet server is not involved in communications between the smart gateway and the remote user device after transmitting the extracted smart gateway IP port information and transmitting the extracted remote user device IP port information; and wherein the method is performed without performing port forwarding on or pre-configuration of the home router.

5. The method of claim 4, wherein:

the Internet server is configured with stored information representative of lists of video feeds associated with user accounts;

the method further includes:

receiving a login request from the app of the remote user device, wherein the login request is associated with one of the user accounts; and providing to the app of the remote user device the list of video feeds associated with the user account associated with the login request; and receiving the request to initiate the streaming video session includes receiving a request for a selected video feed from the list of video feeds provided to the app of the remote user device; and transmitting the command to initiate the streaming video session includes transmitting a command to initiate a video session including the selected video feed.

6. The method of claim 4 wherein:

the Internet server is configured with stored information representative of user accounts;

the method further includes receiving a login request from the app of the remote user device, wherein the login request is associated with one of the user accounts; and transmitting the command to initiate the video session includes transmitting the command based on the user account associated with the login request.

7. A method for operating a remote user device hosting an app to receive and display streamed video from a smart gateway, wherein the smart gateway is located at a home under surveillance, has associated Internet Protocol (IP) port information, and is coupled to an IP camera and a home router at the home under surveillance, and the remote user device has associated IP port information, the method comprising:

transmitting a request to initiate a streaming video session with the home under surveillance, wherein the request is transmitted to an Internet server over the Internet;

transmitting a Uniform Datagram Protocol (UDP) message, wherein the UDP message is transmitted to the Internet server over the Internet and includes the remote user device IP port information;

receiving the smart gateway IP port information, wherein the smart gateway IP port information is received over the Internet from the Internet server;

receiving UDP video messages using the remote user device IP port information, wherein the UDP video messages are received over the Internet, and not though the Internet server;

rendering a display of video using the received UDP video messages;

transmitting UDP keep alive messages using the received smart gateway IP port information, wherein the UDP keep alive messages are transmitted to the smart gateway over the Internet, and not through the Internet server; and wherein the method is performed without performing port forwarding on or pre-configuration of the home router.

8. The method of claim 7 and further including stopping the transmission of the UDP keep alive messages to end the receipt of the streamed video.

9. The method of claim 7 and further including transmitting a login request, wherein the login request is transmitted to the Internet server over the Internet.

10. The method of claim 9 wherein transmitting the login request includes transmitting a request including information representative of a user account.

11. The method of claim 10 and further including receiving from the Internet server over the Internet and displaying information associated with the user account.

12. The method of claim 11 wherein:
    receiving and displaying the information associated with the user account includes receiving and displaying a list of video feeds; and
    transmitting the request to initiate the streaming video session includes transmitting a request for a selected on of the video feeds from the list of video feeds.

* * * * *